April 22, 1969 — W. A. BARBER — 3,440,107

METHOD FOR PREPARING FUEL CELL ELECTRODES

Filed Dec. 20, 1966

INVENTOR.
WILLIAM AUSTIN BARBER
BY
ATTORNEY

United States Patent Office 3,440,107
Patented Apr. 22, 1969

3,440,107
METHOD FOR PREPARING FUEL CELL ELECTRODES
William Austin Barber, Stamford, Conn., assignor to American Cyanamid Company, Stamford, Conn., a corporation of Maine
Continuation-in-part of application Ser. No. 511,075, Dec. 2, 1965. This application Dec. 20, 1966, Ser. No. 611,516
Int. Cl. H01m 27/10; C23e 17/02
U.S. Cl. 136—120                    10 Claims

ABSTRACT OF THE DISCLOSURE

A method for preparing an electrode adapted for use in a fuel cell is provided which comprises the steps of: treating in the presence of an electrically conductive filler a noble metal compound containing at least one element selected from the group consisting of platinum, rhodium and mixtures thereof with a polysubstituted silane containing a Si-H group in an alcoholic solvent environment at a temperature between about 20° C. and 100° C., and precipitating on said conductive filler a chemically reduced noble metal having a crystallite size ranging from between about 20 A. and about 35 A.

---

Figure 1:
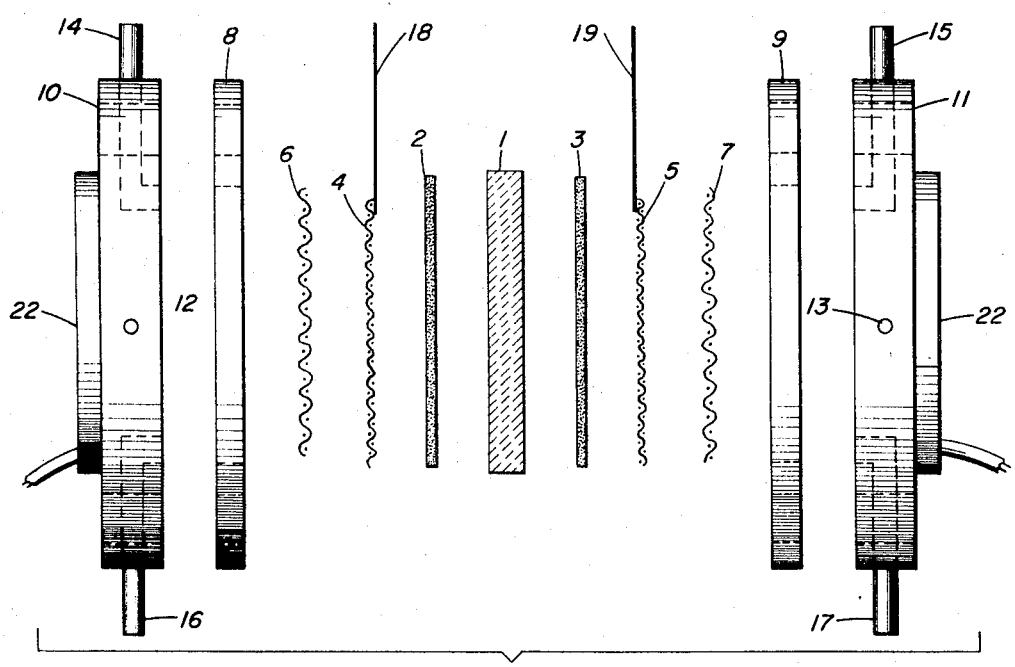

This application is a continuation-in-part of my co-pending application, Ser. No. 511,075, filed on Dec. 2, 1965.

The invention relates to a novel method for preparing catalytic electrodes of enhanced performance eminently suitable for use in a variety of fuel cells for the generation of electricity, such as the hydrogen-oxygen, hydrogen-air, hydrazine-oxygen or ammonia-oxygen fuel cell. More particularly, the invention relates to the preparation of a catalytic electrode comprising a silane-reduced noble metal having a crystallite size which averages between about 20 A. and about 35 A.

As is known, noble metal catalysts, such as platinum, palladium and rhodium, have been employed in electrode structures for use in either alkaline or acid fuel cells. Usually, the noble metal catalysts are initially formed by chemical reduction utilizing, for instance, alkali metal borohydrides. The reduced metal is deposited on an electrically conductive filler, such as carbon. Resultant mixture is next waterproofed and spread on a metallic screen to form an electrode which is widely used in the fuel cell art. However, electrodes so prepared perform rather poorly with increasing current densities and attendant decrease in voltages. As a consequence, continued and sustained effort involving time and money has been expended so as to obtain both increased current densities and increased voltages by attempting to perfect electrodes containing at least one noble metal catalyst.

It is, therefore, a principal object of the invention to provide a process for preparing a formed, noble metal catalyst suitable for use as the active component in an electrode for a fuel cell. A further object of the invention is to provide a straightforward and relatively inexpensive method for preparing an enhanced electrode containing chemically reduced noble metal catalysts. These and other advantages will become apparent from a consideration of the following detailed description.

To this end, it has been unexpectedly found that electrodes prepared from a silane-reduced noble metal compound are enhanced to an extent hitherto unknown. Surprisingly, a silane-reduced noble metal is obtained in particulate form, the average diameter of each resultant crystallite being not greater than about 35 A. This result is in contradistinction to that obtained by the use of typical alkali metal borohydride reduction in recovering a noble metal catalyst whose average crystallite size is usually not less than about 65 A. Thus, by utilizing the silane method of this invention for reducing a noble metal compound, reduced noble metal of markedly high activity, which is characterized by extremely well-dispersed metal crystallites of between about 20 A. and about 35 A., is obtained. Thus, marked improvement in terms of fuel cell performance has been surprisingly provided.

According to the process of the invention, the noble metal catalyst which is suitable for use as an effective electrode component can be prepared in an inexpensive and straight forward manner. This is accomplished by the reduction of a noble metal compound, such as chloroplatinic acid, rhodium chloride or mixtures thereof, as well as their corresponding bromo or iodo derivatives, in an alcoholic solvent with a substituted silane. The reduction takes place at temperatures between about 20° C. and about 100° C., while agitating in the presence of a conductive filler. The latter is added prior to reduction, so that the particles of noble metal which form as soon as reduction occurs, will precipitate on or coat the conductive filler.

To the resultant catalyst mixture as prepared, there is next added a binder-waterproofing agent in aqueous emulsion form comprising, for instance, polytetrafluoroethylene, polychlorotrifluoroethylene or polyethylene. A spreadable paste is formed. This paste can be spread on a suitable surface. One such surface is glass which may, upon drying, permit the formation of a strippable sheet. Alternatively, and more desirably, the paste can be spread on a suitable screen or grid. Illustrative of the latter is: stainless steel, tantalum, nickel or asbestos paper.

Utilizing known X-ray techniques, it is found that the crystallite size of the noble metals as prepared in accordance with the process of the invention and incorporated into an electrode structure can vary from about 20 A. to about 35 A. Where known reducing agents other than substituted silanes are employed, it has been noted from X-ray analysis that the crystallite size of the noble metals usually exceeds 65 A.

In general, any alcoholic solvent can be employed during reduction, provided the solvent maintains the substituted silane in solution. Exemplary of such solvents are, for instance, methanol, ethanol, propanol and butanol.

As illustrative of the substituted silane employed in the process of the invention, there can be mentioned the following: dimethyl silane, diethyl silane, triethyl silane, triisopropyl silane, tributyl silane, diphenyl silane, ditolyl silane, triphenyl silane, tribenzyl silane and triethoxy silane. In each of the aforementioned silanes which are soluble in alcoholic solvents, there is present a Si-H group, whereby reduction can be effected.

An electrode containing the hereinabove described silane-reduced noble metal can be cut to any desired shape for use in a fuel cell. As is known, there is employed in a fuel cell a matrix or membrane which separates electrodes prepared according to the process of this invention. Alternatively, one of the aforementioned electrodes separated by the matrix can be prepared by well known prior art methods in which no precaution is taken with respect to reduction of the catalyst component therein.

The matrix component of the fuel cell is saturated with either base or acid electrolyte. Ordinary filter paper, asbestos fiber paper as well as polymeric membranes containing commercially available ion exchange materials can be used. The latter material may also be used in either a leached or water-equilibrated state. For illustrative purposes, ordinary filter paper which is saturated with either 5 N potassium hydroxide or 5 N sulfuric acid can be employed herein as the matrix or electrode-separating membrane.

In general, one preferred hereinbelow defined fuel cell which falls within the purview of the present invention comprises three essential elements: base or acid electrolyte, electrodes or electrocatalysts, one of which comprises the electrode of the present invention, and current collectors. Suitable collectors can be perforated or corrugated plates or metallic screens and equivalents thereof.

Figure 2:
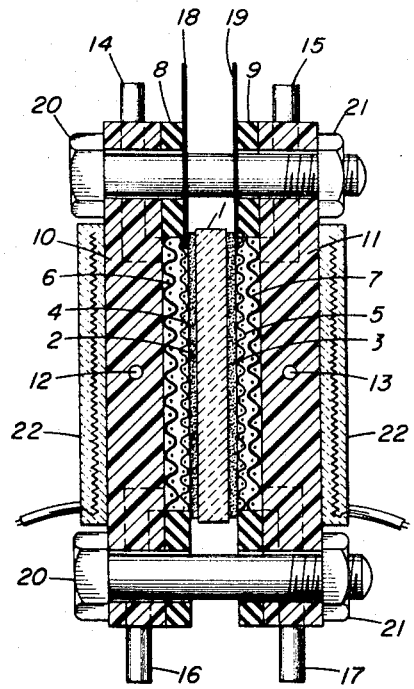

In order to further clarify the invention, these and other embodiments thereof are shown in the accompanying drawing and will be described in detail in conjunction with said drawing. In the drawing:

FIGURE 1 is an exploded plan view, partially in section, of a fuel cell employing the electrode of the present invention, and FIGURE 2 is a partially expanded side view, partially in section, of the fuel cell of FIGURE 1.

In FIGURE 1, a 5 N potassium hydroxide or a 5 N sulfuric acid saturated filter paper membrane 1, is positioned between a fuel electrode 2 and an oxygen electrode 3. Abutting the latter electrodes are current collector screens 4 and 5 which comprise nickel, stainless steel, tantalum or other suitable inert metal. Nickel or tantalum wire mesh spacers 6 and 7 are employed to compress the collector screens against the electrodes providing for better contact between screen and electrode as well as electrode and membrane. The wire mesh spacers are positioned exteriorly to the current collectors. To the outside of the spacers are gaskets 8 and 9 of any suitable material, such as polytetrafluoroethylene or silicone rubber. These seal as well as separate the chambers containing reactants. Exterior to the gaskets are housing members 10 and 11 to which are attached thermocouple 12 and heat control probe 13 and having inlet stainless steel or other inert metal tubing 14 and 15 through which hydrogen and oxygen are separately introduced into the fuel cell. Stainless steel tubing 16 and 17 are provided as vents for unused gases. Wire leads 18 and 19, connected to current collector screens 4 and 5, are the conductive members through which current flows from and to the fuel cell through the external circuit when the fuel cell is in operation. The cell, secured by means of bolts 20 and nuts 21 as shown in FIGURE 2, can be heated, if desired, by an external electrical heating pad 22. The temperature of the cell, determined by the thermocouple 12, is controlled by heat control probe 13.

Performance of electrodes prepared from noble metal compounds and mixtures of such metal compounds is set forth in the following examples which are merely illustrative and not to be taken as limitative of the invention. Further, each of the examples incorporates the fuel cell defined by the above drawing. Unless otherwise stated, the parts are by weight.

EXAMPLE 1

In a suitable vessel are suspended 9 parts of graphite (prepared as a by-product of calcium cyanamide manufacture) in 300 parts of ethyl alcohol. There are then added 2.5 parts of chloroplatinic acid which readily dissolves in alcohol. Resultant mixture is heated to 75° C. with agitation. While maintaining the temperature at 75° C., 3 parts of diphenyl silane previously diluted with 75 parts of ethyl alcohol are slowly added thereto. Reduction of the chloroplatinic acid takes place and platinum metal is deposited on the graphite. With continued agitation, the mixture is held at between about 75° C. and 80° C. for at least 20 minutes. The temperature is then reduced and the contents of the reaction vessel are washed in a suitable container with ethanol and then with water. The respective liquids are decanted and the solid material comprising platinum deposited on carbon is then dried. Resultant dried material is analyzed as containing 10% platinum on carbon. The latter material is admixed with an aqueous dispersion of polytetrafluoroethylene binder and waterproofing agent and spread on a 100 mesh nickel screen, whereby an electrode sheet containing one milligram of platinum per square centimeter of electrode surface area is prepared. As determined by X-ray, the crystallite size of the platinum present in the electrode is found to average 30 A.

A one inch disc cut from the above-prepared electrode sheet is placed on the hydrogen side of a hereinabove described hydrogen-oxygen fuel cell utilizing 5 N KOH electrolyte matrix. As the oxygen electrode, there is employed a platinum black electrode having a ten milligram per square centimeter loading.

Comparative data over a wide range of current densities at 70° C. utilizing the above-described electrode and one prepared, for instance, by sodium borohydride reduction following the procedure hereinabove described, but substituting sodium borohydride in lieu of diphenyl silane, are shown in Table I below.

TABLE I

| Electrode | Current density (ma./cm.$^2$) as hydrogen electrode (volts) at— | | |
|---|---|---|---|
| | .85 | .80 | .75 |
| NaBH$_4$, reduced 1 mg. Pt./cm.$^2$ | 60 | 100 | 135 |
| Silane, reduced 1 mg. Pt./cm.$^2$ | 130 | 180 | 230 |

EXAMPLE 2

The procedure of Example 1 is repeated in every detail except that the reducing agent employed in preparing the electrode is triethyl silane. Substantially the same performance as noted in Table I is obtained.

EXAMPLE 3

The procedure of Example 1 is repeated in every detail except that propanol as a solvent and tributyl silane as a reducing agent are employed. An electrode is prepared demonstrating substantially the same fuel cell performance when so incorporated therein.

EXAMPLE 4

Again the procedure of Example 1 is followed in every detail except that instead of 2.5 parts of chloroplatinic acid there is employed a mixture of 1.25 parts of chloroplatinic acid and 1.25 parts of rhodium chloride and the resulting electrode containing 0.5 milligram of platinum and 0.5 milligram of rhodium per square centimeter is tested as was the electrode of Example 1. Unexpectedly, the test results are markedly superior when comparing the electrode of the instant invention with that employing an equal amount of platinum and rhodium obtained by the reduction of the latter utilizing conventional sodium borohydride reduction techniques. The performance of each cell is summarized in Table II below.

TABLE II

| Electrode | Current density (ma./cm.$^2$) as hydrogen electrode (volts) at— | | | |
|---|---|---|---|---|
| | .90 | .85 | .80 | .75 |
| NaBH$_4$, reduced 0.5 mg. Pt +0.5 mg. Rh/cm.$^2$ | 60 | 120 | 200 | 300 |
| Silane, reduced 0.5 mg. Pt +0.5 mg. Rh/cm.$^2$ | 90 | 170 | 270 | 360 |

EXAMPLE 5

The procedure of Example 1 is repeated in every detail except that 2.5 parts of rhodium chloride are substituted for the mixture of noble metal catalysts of Example 4. There is obtained a reduced rhodium metal catalyst which exhibits markedly improved performance characteristics when incorporated in an electrode which forms a vital component of the fuel cell.

EXAMPLE 6

Repeating the procedure of Example 1 in every detail except that the one inch disc cut from the electrode sheet is placed on the oxygen side of a hydrogen-oxygen fuel cell as described hereinabove. As the hydrogen electrode, there is employed a conventional platinum black electrode having a ten milligram per square centimeter loading.

The performance data of each cell is presented in Table III below.

TABLE III

| Electrode | Current density (ma./cm.$^2$) as oxygen electrode (volts) at— | | |
|---|---|---|---|
| | .85 | .80 | .75 |
| NaBH$_4$, reduced 1 mg. Pt/cm.$^2$ | 40 | 100 | 160 |
| Silane, reduced 1 mg. Pt/cm.$^2$ | 90 | 180 | 270 |

EXAMPLE 7

The procedure of Example 1 is repeated in every detail except that the cell is assembled with a one inch disc cut from the electrode on both sides of the cell and it is tested in the same manner as described therein. Resultant data is summarized in Table IV below.

TABLE IV

| Electrode | Current density (ma./cm.$^2$) as both electrodes (volts) at— | | |
|---|---|---|---|
| | .85 | .80 | .75 |
| NaBH$_4$, reduced 1 mg. Pt/cm.$^2$ | 28 | 50 | 72 |
| Silane, reduced 1 mg. Pt/cm.$^2$ | 46 | 95 | 140 |

EXAMPLE 8

Example 1 is repeated except that the catalyst is mixed with polytetrafluoroethylene binder and spread on a 50 mesh tantalum screen to obtain an electrode for use in a fuel cell utilizing an acid electrolyte.

A one inch disc is cut from the resultant electrode and assembled in a fuel cell described hereinabove. There are also provided a 5 N sulfuric acid electrolyte matrix and tantalum elements so as to reduce corrosion due to the presence of acid electrolyte.

The electrode disc is placed on the oxygen side of a hydrogen-oxygen fuel cell with a platinum black electrode as the hydrogen electrode. Data is obtained from this cell as well as from a comparison cell using NaBH$_4$-reduced platinum catalyst. The results are presented in Table V below.

TABLE V

| Electrode | Current density (ma./cm.$^2$) as oxygen electrode (volts) at— | | |
|---|---|---|---|
| | .80 | .75 | .70 |
| NaBH$_4$, reduced 1 mg. Pt/cm.$^2$ | 5 | 12 | 30 |
| Silane, reduced 1 mg. Pt/cm.$^2$ | 40 | 90 | 160 |

EXAMPLE 9

Repeating Example 8 in every detail except that the electrode is employed on both the hydrogen and oxygen sides of the cell. The cell is next tested in the same manner as in Example 8. The data obtained is recorded in Table VI below.

TABLE VI

| Electrode | Current density (ma./cm.$^2$) as both electrodes (volts) at— | | |
|---|---|---|---|
| | .80 | .75 | .70 |
| NaBH$_4$, reduced 1 mg. Pt/cm.$^2$ | 4 | 12 | 30 |
| Silane, reduced 1 mg. Pt/cm.$^2$ | 26 | 56 | 100 |

EXAMPLE 10

Example 1 is repeated except that the platinum is deposited on the carbon at a level of 5%. Resultant catalyst is made into electrodes to yield a platinum loading of 0.5 mg. Pt/cm.$^2$. These electrodes are tested as in Example 1. The performance data is presented in Table VII below.

TABLE VII

| Electrode | Current density (ma./cm.$^2$) as hydrogen electrode (volts) at— | | |
|---|---|---|---|
| | .85 | .80 | .75 |
| NaBH$_4$, reduced 0.5 mg. Pt/cm.$^2$ | 45 | 63 | 83 |
| Silane, reduced 0.5 mg. Pt/cm.$^2$ | 84 | 119 | 154 |

It is clear from a consideration of the foregoing tables that the silane-reduced platinum catalyst markedly enhances the electrodes prepared therefrom.

I claim:

1. In a process for preparing an electrode adapted for use in a fuel cell, the improvement which consists essentially in the steps of: applying to an electrically conductive filler a composition including a noble metal compound containing at least one element selected from the group consisting of platinum, rhodium and mixtures thereof and a polysubstituted silane containing a Si-H group in an alcoholic solvent environment at a temperature between about 20° C. and 100° C., and under normal atmospheric pressure on said conductive filler to form noble metal at said temperature and pressure and having a crystallite size ranging from between about 20 A. and about 35 A.

2. In a process for preparing an electrode adapted for enhanced performance in a fuel cell for generating electricity, the improvement which consists essentially in the steps of: applying to an electrically conductive filler a composition including a noble metal compound containing at least one element selected from the group consisting of platinum, rhodium and mixtures thereof and a polysubstituted silane containing a Si-H group in an alcoholic solvent environment at a temperature between about 20° C. and 100° C. and under normal atmospheric pressure, said metal compound being chemically reduced on said conductive filler to a form a noble metal at said temperature and pressure and having a crystallite size ranging from between about 20 A and about 35 A., forming an electrode from the latter; and incorporating said resultant electrode in a fuel cell.

3. The process according to claim 2 wherein the reduction is carried out in the presence of ethanol.

4. The process according to claim 2 wherein the reduction is carried out in the presence of propanol.

5. The process according to claim 2 wherein the noble metal compound prior to reduction comprises chloroplatinic acid.

6. The process according to claim 2 wherein the noble metal compound prior to reduction comprises a mixture of chloroplatinic acid and rhodium chloride.

7. The process according to claim 2 wherein the noble metal compound prior to reduction comprises rhodium chloride.

8. The process according to claim 2 wherein the reducing agent is diphenyl silane.

9. The process according to claim 2 wherein the reducing agent is triethyl silane.

10. The process according to claim 2 wherein the reducing agent is tributyl silane.

References Cited

UNITED STATES PATENTS 3,291,753   12/1966   Thompson _____ 136—86

WINSTON A. DOUGLAS, *Primary Examiner.*

C. F. LE FEVOUR, *Assistant Examiner.*

U.S. Cl. X.R.

75—108; 136—86